(12) United States Patent
Ogino

(10) Patent No.: US 6,813,309 B1
(45) Date of Patent: Nov. 2, 2004

(54) CDMA RECEIVING METHOD AND CIRCUIT

(75) Inventor: Tooru Ogino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/720,980

(22) PCT Filed: Jun. 23, 1999

(86) PCT No.: PCT/JP99/03336

§ 371 (c)(1),
(2), (4) Date: Jan. 3, 2001

(87) PCT Pub. No.: WO00/02338

PCT Pub. Date: Jan. 13, 2000

(30) Foreign Application Priority Data

Jul. 3, 1998 (JP) .......................................... 10-189374

(51) Int. Cl.[7] .............................................. H04B 1/69
(52) U.S. Cl. ...................................... 375/148; 375/130
(58) Field of Search ................................. 375/148, 130, 375/147, 316; 370/342, 335, 320, 441

(56) References Cited

U.S. PATENT DOCUMENTS

| | | | | |
|---|---|---|---|---|
| 5,652,765 A | * | 7/1997 | Adachi et al. ............... | 375/211 |
| 6,625,197 B1 | * | 9/2003 | Lundby et al. ............. | 375/130 |
| 6,647,003 B1 | * | 11/2003 | Abeta et al. ................ | 370/335 |

FOREIGN PATENT DOCUMENTS

| | | |
|---|---|---|
| JP | 7-202843 | 8/1995 |
| JP | 8-163107 | 6/1996 |
| JP | 9-121202 | 5/1997 |
| JP | 09-181704 | 7/1997 |
| JP | 9-321664 | 12/1997 |
| JP | 10-308689 | 11/1998 |
| JP | 11-4213 | 1/1999 |

* cited by examiner

Primary Examiner—Khai Tran
(74) Attorney, Agent, or Firm—Young & Thompson

(57) ABSTRACT

A Code Division Multiple Access (CDMA) reception method in a mobile terminal uses a spread spectrum to realize communication, performs a search of arrived radiowaves that detects radiowaves of propagation paths having different delay times, and uses RAKE combining to combine received signals from radiowaves of different propagation paths. The reception state of the received signals is detected, and when the reception state meets a prescribed condition, the range of delay time in which a search of arrived radiowaves is performed is modified. In a case in which the fading pitch is used as the amount of fluctuation of the received electric field, for example, the reciprocal of the fading pitch is compared with a prescribed threshold value, or the speed of movement of the mobile terminal is first calculated from the fading pitch and this speed of movement is compared with a threshold value, and when the threshold value is smaller, a peak search is performed only in the vicinities of peaks found in the preceding search.

29 Claims, 12 Drawing Sheets

CDMA RECEIVING METHOD AND CIRCUIT

TECHNICAL FIELD

The present invention relates to a reception method and reception circuit in a wireless communication system employing CDMA (Code Division Multiple Access), and in particular, to a reception method and reception circuit that employ a RAKE combining receiver.

BACKGROUND ART

CDMA is one multiple access technique in wireless communication systems. The application of CDMA in a mobile communication system made up by a base station and a plurality of mobile communication terminals has the advantages of both allowing an increase in the number of terminals that can be accommodated by the system and a reduction of the transmission power.

Spread-spectrum modulation is generally used in communication systems that employ CDMA. In communication by spread-spectrum modulation, the transmission signals are subjected to spreading modulation using a PN (Pseudo-random Number) code as a spreading code on the transmitting side to spread the spectrum of transmission signals, and these signals are then sent to the receiving side. On the receiving side, the demodulated transmission signals are obtained by establishing synchronization and then subjecting the received signals that have a spread spectrum to despreading using the same PN code as was used on the transmission side. This PN code that is the same as was used on the transmission side is referred to as the "spreading code replica."

Although direct sequence is used as the method of spread-spectrum modulation in the following explanation, the same discussion holds true if a frequency-hopping spread modulation or the like is employed.

Radio waves that arrive at a receiving station from a transmitting station include, in addition to direct waves, i.e., the component that is propagated directly from the transmitting station to the receiving station, components that are reflected by, for example, mountains, the ground surface, and buildings, and reach the receiver by different propagation paths. The number of radiowave components that pass over different paths are equal in number to the different propagation paths, and the time for each radiowave component to arrive at the receiving station differs according to the length of path taken to arrive at the receiving station. These radiowave components that pass over different paths are referred to as the multipath components. Collecting and combining these different radiowaves having different arrival times while giving each a delay time according to the time to arrive would allow addition of these signals to the received signal of the direct wave, thereby enabling a larger received signal than for the direct wave alone, an improvement in S/N (signal-to-noise ratio), and with this improvement in S/N ratio, a reduction in transmission power.

The direction of arrival of a radiowave component as seen from the receiver differs for each propagation path, and the technique of increasing reception sensitivity by receiving and combining radiowaves that arrive from many directions is called RAKE combining because a visual representation would be similar to a rake.

FIG. 1 is a block diagram showing the configuration of a conventional receiver used in a CDMA communication system that employs RAKE combining, i.e., a RAKE receiver. Although here referred to as a receiver, this is actually a mobile terminal that communicates with a base station in a CDMA mobile communication system.

This receiver is provided with: antenna 222, transmission/reception filter 221 connected to antenna 222 for separating transmission signals and received signals; reception radio-frequency unit 201 connected to the receiving-side port of transmission/reception filter 221 for amplifying and frequency-converting radio-frequency received signals received at antenna 222 and converting it to received signals on the baseband; a plurality of baseband reception units 202 that receive baseband received signals in parallel from reception radio-frequency unit 201 and perform despreading of received signals using a prescribed PN code; power combiner 204 that combines signals after despreading that are outputted from each of baseband reception units 202; reception speech processor 206 for decoding the combined signal to a speech signal; ear receiver 207 for outputting speech after processing; and arrived radiowave search circuit 203 that performs a search of arrived radiowaves of each propagation component for carrying out RAKE combination and that reports the timing of despreading for each of baseband reception units 202. The example shown in the figure is provided with six baseband reception units 202. In this case, reception radio-frequency unit 201, baseband reception units 202, arrived radiowave search circuit 203, power combiner 204, reception speech processor 206, and ear receiver 207 constitute a reception unit. This receiver is further provided with a transmission unit that is made up of: microphone 210 that converts input speech to an electronic signal (speech signal), transmission speech processor 211 that encodes the speech signal that is outputted from microphone 210, baseband transmission processor 213 that spread-modulates the encoded signal by a prescribed PN code and converts it into baseband transmission signals; and transmission radio-frequency unit 214 that converts baseband transmission signals to radio-frequency transmission signals. The output of transmission radio-frequency unit 214, i.e., radio-frequency transmission signals, are applied to the transmission-side port of transmission/reception filter 221.

Since the arrival times of radiowaves differ for differing propagation paths, the receiver shown in FIG. 1 not only has a plurality of baseband reception units 202 for despreading the baseband signals, but uses arrived radiowave search circuit 203 to find the arrival time of each component having a different propagation path. Arrived radiowave search circuit 203 then reports the arrival time (delay time) of the radiowave component of each propagation path to a respective baseband reception unit 202, and each baseband reception unit 202 carries out despreading of the received radiowaves while shifting the timing of the PN code in accordance with the reported arrival time. Since the timing of the PN code is shifted according to the arrival times, the signals that are outputted from each of baseband reception units 202 after despreading have matched phase, and combination of the power of these signals at power combiner 204 enables a larger received signal. In a RAKE receiver, the component that carries out despreading for each arrival time is called a "finger." The above-described RAKE receiver has six baseband reception units 202, and thus has six fingers.

The chip rate of the PN code that is used for spread modulation on the transmission side and despreading on the receiving side may be, for example, 4 MHz, in which case the time per chip is 0.25 μs. In contrast, the difference in arrival times of the multipath components may reach several tens of microseconds. FIG. 2 is a graph showing the relation between the delay times (the amount of shift in chip phase) and the received power after despreading if the chip phase of the PN code used in despreading is shifted by degrees, for example, by ¼ chip, in an environment in which the radiowaves on different propagation paths are received at the same time. This graph is called a delay profile.

Since radiowaves that arrive from a transmission station by different propagation paths will have different arrival times, peaks will occur in the received power at different delay times. The example shown in the figure has three peaks, peak #1, peak #2, and peak #3, and the spacing of these three peaks corresponds to the difference in arrival times. Arrived radiowave search circuit 203 searches for the positions of these peaks and assigns one peak to each of baseband reception units 202. The search for the positions of peaks in this case is equivalent to finding differences in arrival times. In each of baseband reception units 202, the radiowave component that has arrived by the propagation path that corresponds to the assigned peak undergoes despreading by carrying out despreading of the received signal by the PN code of the chip phase that corresponds to the assigned peak position. In this way, the received signals of the radiowave components of each of the different propagation paths undergo appropriate despreading at each baseband reception unit, and the despread received signals are power-combined to enable an increase in the intensity of the received signal and an improvement in the S/N.

FIG. 3 is a block diagram showing an example of the configuration of the arrived radiowave search circuit in the conventional RAKE receiver. This arrived radiowave search circuit is provided with: despreading unit 231 that is given a PN code and that performs despreading of received signals based on the PN code; integrator 232 that integrates the output signal from despreading unit 231 over the time interval of one symbol and integrates over a still longer period; dual-port RAM (DPRAM) that stores the output values of integrator 232; searcher circuit 235 that searches inside dual-port RAM, detects peaks for each delay time, and assigns peak positions for each of baseband reception units 202; PN code generator 236 that generates the PN code; and control unit 237 that both controls the phase of the PN code that is generated by PN code generator 236 and controls the write addresses of dual-port RAM 234. The despreading of received signals is then performed in despreading unit 231 while shifting the phase of the PN code that is generated at PN code generator 236 by increments of, for example, ¼ chip; the output from despreading unit 231 is integrated at integrator 232; and the value of the integration result is stored in dual-port RAM 234 in correspondence with the phase of the PN code at that time. A delay profile such as is shown in FIG. 2 is thus stored in dual-port RAM 234. Searcher circuit 235 searches inside this dual-port RAM 234, determines a peak position that is to be assigned to each of baseband reception units 202, and reports to each baseband reception units 202 an arrival time difference that corresponds to a determined peak position.

In a mobile communication system such as an automobile telephone system or portable telephone system, at least one of a transmission station and receiving station can be assumed to be moving, thereby causing the propagation paths of radiowaves between the transmission station and receiving station to change minute to minute and the positions of peaks that correspond to propagation paths to also change as a result. In some cases, a propagation path may disappear and the associated peak may vanish, or a new propagation path may occur and a new peak also appear as a result. In particular, a delay profile may change abruptly when a mobile unit is moving at high speed, and the peaks of arrived radiowaves must constantly be searched to prevent loss of the peak positions.

As an example, Japanese Patent Laid-open No. 181704/97 (JP, 09181704,A) discloses a multipath search method and CDMA signal receiver that can follow changes in the delay profile of a CDMA signal and perform RAKE combination of a plurality of propagation paths. In this method, a receiver is used that includes a search finger and tracking fingers that are similar to the above-described baseband reception unit. As shown in FIG. 4, the levels of received signal are detected at all chip phases by the search finger in Step S1 as the initial operation. Based on the mean received signal level that is detected in this initial search, paths that are to undergo RAKE combining are selected in Step S2, and the phases of these selected paths are detected using the tracking fingers. After performing integration and damping, demodulation is performed for each path, following which RAKE combining is carried out. Each tracking finger has the function of independently tracking each path. When paths overlap, i.e., when the same peak is assigned to tracking fingers, a selected path is reassigned to one tracking finger based on ranking information of the received signal levels in Step S4. On the other hand, the search finger shown in Step S3 detects the received signal levels for all chip phases of the range of delay times that are to undergo RAKE combining. An average is taken for each chip phase and RAKE combining paths are selected at a fixed period, and a corresponding spreading code replica code (PN code) is then given to each tracking finger.

FIG. 5 is a block diagram showing the configuration of the CDMA signal receiver disclosed in the above-described Japanese Patent Laid-open No. 181704/97. This receiver is provided with a plurality of tracking fingers 300, search finger 350, long code spreading code replica generator 381 that generates a PN code, RAKE combining path selector 382 for selecting paths that are to undergo RAKE combining; detectors 383 that each perform absolute synchronous detection of the output of a respective tracking finger 300; and RAKE combining circuit 385 that performs RAKE combining of the output of each detector 383 and outputs as an output signal. A received input spread signal is supplied to each tracking finger 300 and search finger 350.

Since each tracking finger 300 is provided with an independent tracking function as described in the foregoing explanation, two sets of multipliers 301 and 302 and integration-damping circuits 304 and 305 are provided for tracking in addition to multiplier 303 and integration-damping circuit 307 that are provided for signal reception. Multipliers 301 to 303 are for multiplying a PN code with a received input spreading signal and performing despreading, and integration-damping circuits 304, 305, and 307 are for integrating the outputs of multipliers 301 to 303 at fixed time intervals. Amplitude squaring circuits 308 and 309 are provided for squaring each of the outputs (amplitudes) of integration-damping circuits 304 and 305 for tracking. In addition, each tracking finger 300 is provided with: subtractor 310 for calculating the difference in outputs of amplitude squaring circuit 308 and 309; loop filter 311 for receiving the outputs of subtractor 310; spread code replica timing control signal generator 312 for determining the amount of delay (timing) of the PN code based on the output of loop filter 311; and spreading code replica delay unit 306 for giving a delay, for each of multipliers 301 to 303, to a PN code from long code spreading code replica generator 381 based on control signals from spreading code replica timing control signal generator 312 and outputting to these multipliers 301 to 303.

Search finger 350 is provided with: multiplier 351 for multiplying the received input spreading signal with the PN code; integration-damping circuit 352 for integrating the output of multiplier 351 at fixed intervals; amplitude squaring circuit 353 for calculating the square of the output (amplitude) of integration-damping circuit 352; reception level memory 354 for storing the delay profile based on the output of amplitude squaring circuit 353; and spreading code replica delay unit 355 for giving a delay to the PN code from long code spreading code replica generator 381 and supplying the delayed PN code to multiplier 351.

As described hereinabove, the delay profile of the received signals must be obtained and the peak positions detected when performing RAKE reception in a mobile communication system. In the case of the circuit shown in FIG. 1, the arrived radiowave search circuit must continue to search for peaks over the entire conceivable range of variation of arrival time differences for each multipath component, and current is therefore constantly consumed. Similarly, in the case of the signal receiver described in Japanese Patent Laid-open No. 181704/97, not only must the search finger be operated constantly, but the circuits for tracking at each tracking finger must also be constantly operated, and the consumed current therefore increases accordingly. In a receiver that performs RAKE combining, the circuits that follow output of the reception radio-frequency unit are typically configured to perform digital signal processing, and the computation load of the integrating process for the peak search is greater than for the integration process for despreading of normal signals and therefore consumes proportionally more power. Moreover, the process of searching dual-port RAM or received level memory to find peak positions entails a process of step-by-step comparison of the data inside this memory and this also leads to greater power consumption.

DISCLOSURE OF THE INVENTION

A search of arrived radiowaves that is performed by the conventional method to realize RAKE reception as described hereinabove results in a high level of power consumption, and in particular, raises the problem of reducing the possible talk time of a mobile terminal that presupposes the use of a battery drive, i.e., in an automobile telephone terminal or portable telephone terminal.

It is therefore a first object of the present invention to provide a reception method that can shorten the time of operation of an arrived radiowave search circuit in a mobile terminal that performs RAKE combining and thus reduce consumption of current.

It is a second object of the present invention to provide a reception circuit that can shorten the time of operation of an arrived radiowave search circuit in a mobile terminal that performs RAKE combining and thus reduce consumption of current.

The first object of the present invention is achieved by a reception method in a mobile terminal that realizes communication by Code Division Multiple Access (CDMA) using a spread spectrum, that performs a search of arrived radiowaves to detect radiowaves of propagation paths having different delay times, and that uses RAKE combining to combine received signals from radiowaves of different propagation paths; wherein the reception method is a CDMA reception method comprising the steps of detecting the reception state of received signals, and changing the range of delay time in which a search of arrived radiowaves is performed when the reception state satisfies a prescribed condition.

The first object of the present invention is also achieved by a reception method in a mobile terminal that realizes communication by Code Division Multiple Access (CDMA) using a spread spectrum, that performs a search of arrived radiowaves to detect the radiowaves of propagation paths having different delay times, and that uses RAKE combining to combine received signals from radiowaves of different propagation paths; wherein the reception method is a CDMA reception method comprising the steps of detecting the amount of fluctuation in the received electric field of the received signals, and changing the range of delay time in which a search of arrived radiowaves is performed when the amount of fluctuation satisfies a prescribed condition.

In the CDMA reception method according to the present invention, the amount of fluctuation in the received electric field is typically the fading pitch or fading depth. In addition, a method can be proposed as the method of limiting the range of delay time in which, for example, the reciprocal of the fading pitch is compared with a prescribed threshold value, or the speed of movement of the mobile terminal is calculated from the fading pitch and this speed of movement is compared with a threshold value, and if the threshold value is smaller, a peak search is carried out only in, for example, the vicinities of previously found peaks, i.e., the vicinities of peaks found in a previous search.

The second object of the present invention is realized by a CDMA reception circuit, which is a reception circuit in a mobile terminal that realizes communication by Code Division Multiple Access (CDMA) using a spread spectrum and that uses RAKE combining to combine received signals from radiowaves of different propagation paths; that comprises: baseband reception means that performs despreading of received signals, electric field intensity measurement means that detects the amount of fluctuation in the received electric field, and an arrived radiowave search circuit that performs a search of arrived radiowaves that detects the radiowaves of propagation paths of different delay times and assigns radiowaves of different propagation paths to respective baseband reception means; and in which the range of delay times of the search of arrived radiowaves that is performed by the arrived radiowave search circuit is modified when the amount of fluctuation satisfies a prescribed condition.

In the CDMA reception circuit of this present invention, the baseband reception means is typically made up from a plurality of baseband reception units required for RAKE reception, i.e., a plurality of fingers.

The delay time of a radiowave on each propagation path changes with movement of the mobile terminal, but it can be assumed that change in the arrival times will be higher at high speeds of movement, and lower at low movement speeds. When the change in the arrival time is low, peaks should be searched only in the vicinities of previously found arrival times, and there is no need for the arrived radiowave search circuit to continue to search for peaks over the entire conceivable range of change in chip phase. Alternatively, the search for arrived radiowaves can be performed intermittently.

In the case of a mobile terminal, fading is observed with movement. The time interval between troughs in the received electric field due to fading is referred to as fading pitch, and fading pitch is dependent on the speed of movement of the mobile terminal. In the present invention, the fading pitch is measured, and this measured fading pitch is compared with a prescribed threshold value, or the speed of movement that is estimated from the measured fading pitch is compared with a prescribed threshold value. The speed of movement of the mobile terminal is determined to be low if the threshold value falls below the fading pitch (in other words, if the threshold value is greater than the reciprocal of the fading pitch), or if the threshold value is greater than the speed of movement. If the speed is determined to be low, the search of arrived radiowaves is performed only in the vicinities of previously found arrival times for each propagation path. This configuration allows the arrived radiowave search circuit to be operated intermittently and can realize a reduction in the power consumption of the entire mobile terminal. Instead of determining if the speed of movement of the mobile terminal is high or low from the fading pitch, the present invention also allows determining whether fading is observable or not. If there is no fading, it can then be determined that the mobile terminal is actually not moving, i.e., is stationary, and in this case the search range of the arrived radiowave search circuit can be drastically limited to realize a still greater reduction in power consumption. In this case, the absence of fading means that, for example, fading is substantially not observable.

BEST MODE FOR CARRYING OUT THE INVENTION

Referring now to the figures, preferable embodiments of the present invention are next explained.

Figure 6:
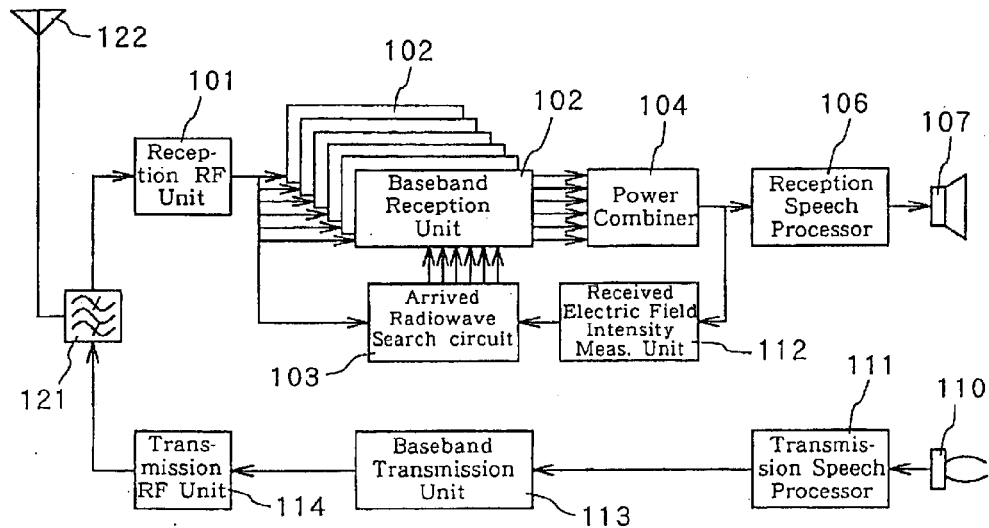
FIG. 6 is a block diagram showing the construction of a receiver according to the basic embodiment of the present invention.

First, regarding the basic embodiment of the present invention will be explained. FIG. 6 is a block diagram showing the construction of a receiver in this embodiment. This receiver uses RAKE combining and is employed in a CDMA communication system. Although referred to as a receiver here, this unit is actually a mobile terminal in a CDMA mobile communication system and communicates with a base station. In concrete terms, this unit is constituted by, for example, a portable telephone.

This receiver is provided with: antenna 22; transmission/reception filter 121 that is connected to antenna 122 for separating transmission signals and received signals; reception radio-frequency unit 101 that is connected to the reception-side port of transmission/reception filter 121 and that amplifies and frequency-converts radio-frequency received signals received at antenna 122 to convert these signals to received signals on the baseband; a plurality of baseband reception units 102 that receive received baseband signals in parallel from reception radio-frequency unit 101 and that perform despreading of the received signals using a prescribed PN code; power combiner 104 that combines signals after despreading that are outputted from each of baseband reception units 102; reception speech processor 106 that decodes the combined signal to a speech signal; ear receiver 107 that outputs speech after processing; arrived radiowave search circuit 103 that performs a search of arrived radiowaves for RAKE combining, detects peaks of each propagation component of differing delay time, and reports a despreading timing to each baseband reception unit 102; and electric field intensity measurement unit 112 that measures the intensity of the received electric field based on signals outputted from power combiner 104 for detecting fading pitch. In the example shown in the figure, six baseband reception units 102 are provided, i.e., the RAKE receiver has six fingers. In this case, reception radio-frequency unit 101, baseband reception units 102, arrived radiowave search circuit 103, power combiner 104, reception speech processor 106, ear receiver 107, and received electric field measurement unit 112 make up the reception unit.

This receiver is further provided with a transmission unit that is made up by: microphone 110 that converts input speech to electrical signals (speech signals); transmission speech processor 111 that encodes the speech signal that is outputted from microphone 110; baseband transmission unit 113 that spread-modulates the encoded signal by a prescribed PN code and converts it to a baseband transmission signal; and transmission radio-frequency unit 114 that converts the baseband transmission signal to a radio-frequency transmission signal. The output of transmission radio-frequency unit 114, i.e., the radio-frequency transmission signal, is applied to the transmission-side port of transmission/reception filter 121.

Since the arrival times of radiowaves of different propagation paths differ, a plurality of baseband reception units (fingers) 102 are provided for despreading the baseband signals for each propagation path, and further, the arrival time of each component having a different propagation path is found by arrived radiowave search circuit 103. Each of baseband reception units 102 performs despreading of received radiowaves while shifting the chip phase, i.e., the timing of the PN code, in accordance with the arrival times that are detected by arrived radiowave search circuit 103. In this way, the despread signals that are outputted from baseband reception units 102 are power-combined in power combiner 104 to obtain a large received signal.

Figure 7:
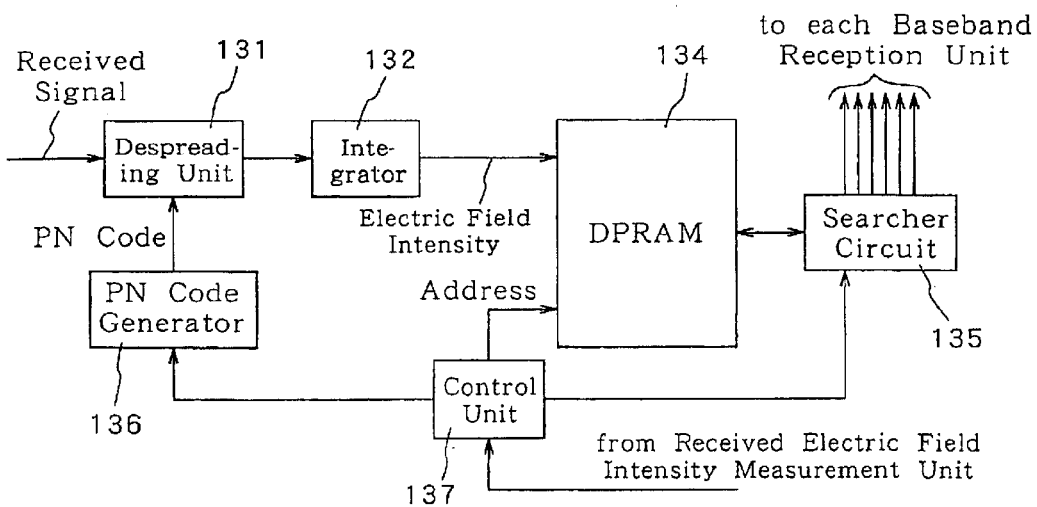
FIG. 7 is a block diagram showing an example of the construction of the arrived radiowave search circuit.

FIG. 7 is a block diagram showing an example of the construction of arrival time search circuit 103. This arrived radiowave search circuit 103 is provided with: despreading unit 131 that is given a PN code and performs despreading of a received signal based on this PN code; integrator 132 that integrates the signal outputted from despreading unit 131 over the time interval of one symbol and then integrates this integration result over a still longer time interval; dual-port RAM (DPRAM) 134 that stores the output value of integrator 132; searcher circuit 135 that searches inside dual-port RAM 134, detects peaks for each delay time, and assigns a peak position for each of baseband reception units 102; PN code generator 136 that generates PN codes; and control unit 137 that performs overall control of arrival time search circuit 103. As will be described hereinbelow, the speed of movement of the mobile unit that incorporates this receiver is estimated in this receiver by electric field intensity measurement unit 112, and control unit 137 receives information from electric field intensity measurement unit 112 regarding whether mobile unit is moving at a high speed. More specifically, control unit 137 not only controls the phase of the PN code that is generated by PN code generator 136 and controls the addresses when writing to dual-port RAM 134, but also determines the range of the peak search that is performed by arrival time search circuit 103 based on the information from electric field intensity measurement unit 112 and determines the timing of the operation of arrival radiowave time search circuit 103.

Figure 1:
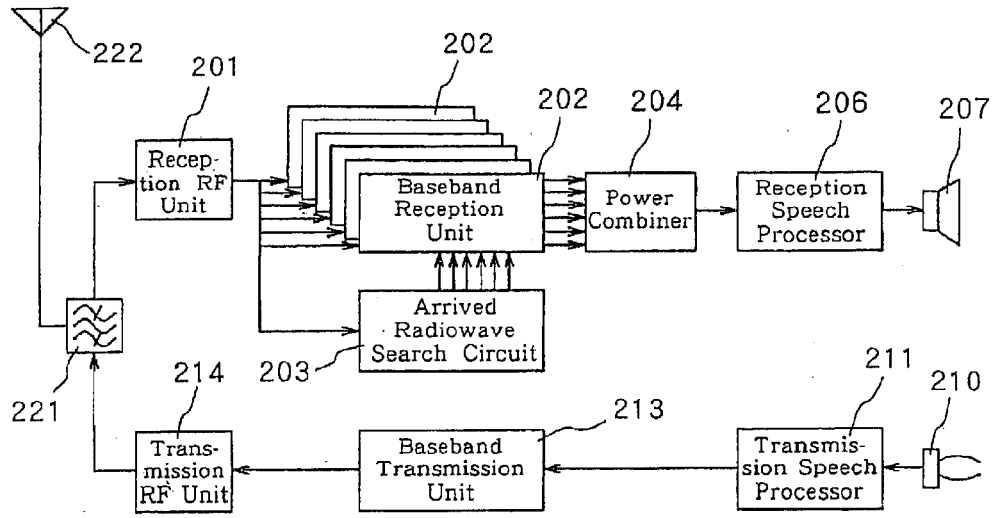
FIG. 1 is a block diagram showing the construction of a conventional receiver that employs RAKE combining and that is us in a CDMA communication system.
Figure 2:
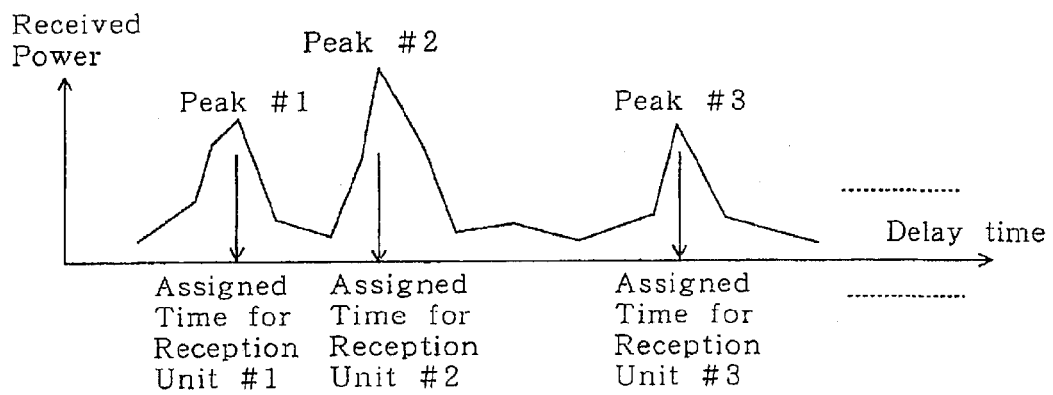
FIG. 2 is a graph showing the relation between the amount of delay in a PN code and the received power.
Figure 3:
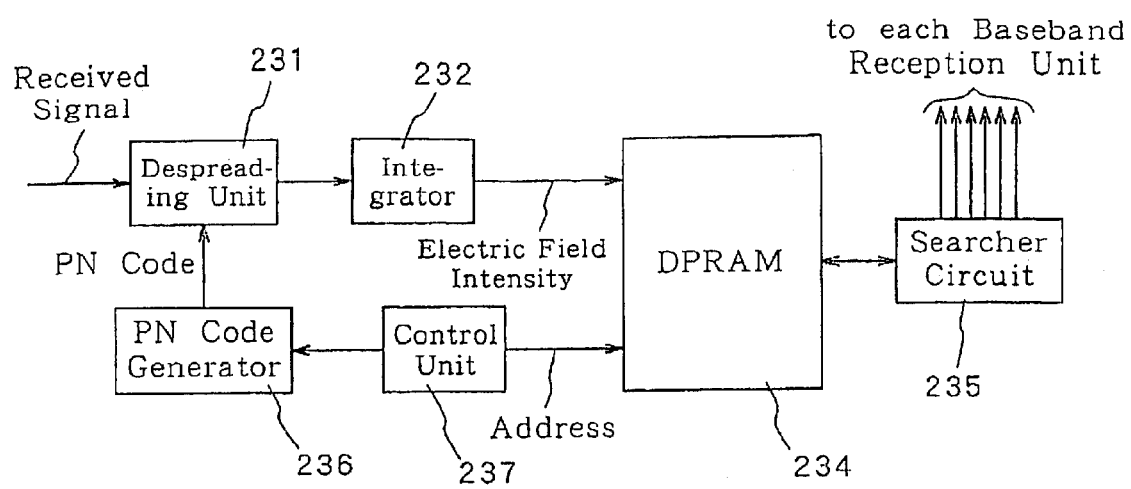
FIG. 3 is a block diagram showing an example of the construction of an arrival time search circuit in the conventional receiver.
Figure 4:
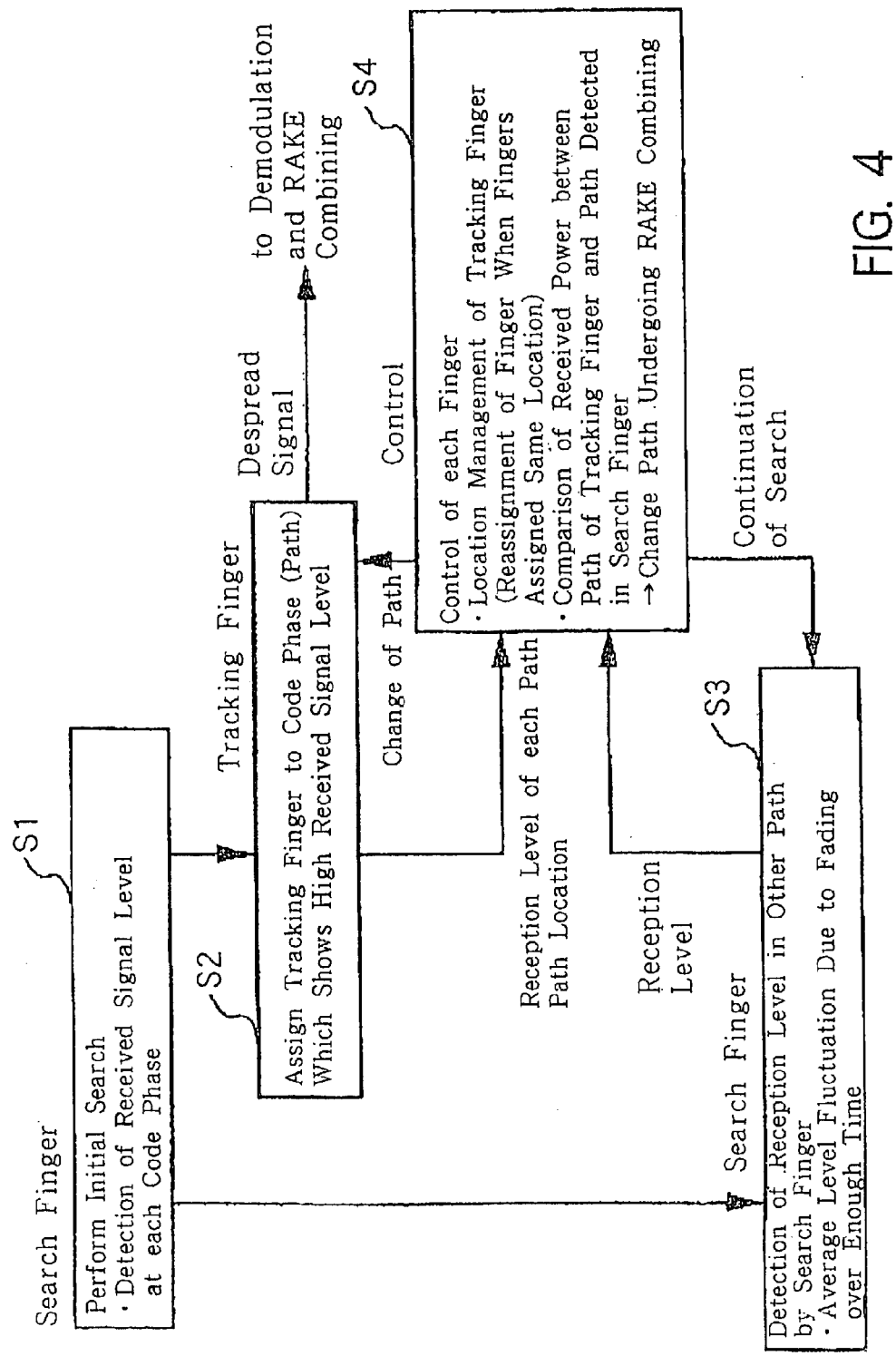
FIG. 4 shows the procedures of a multipath search method of the prior art that allows RAKE combination of a plurality of paths.
Figure 5:
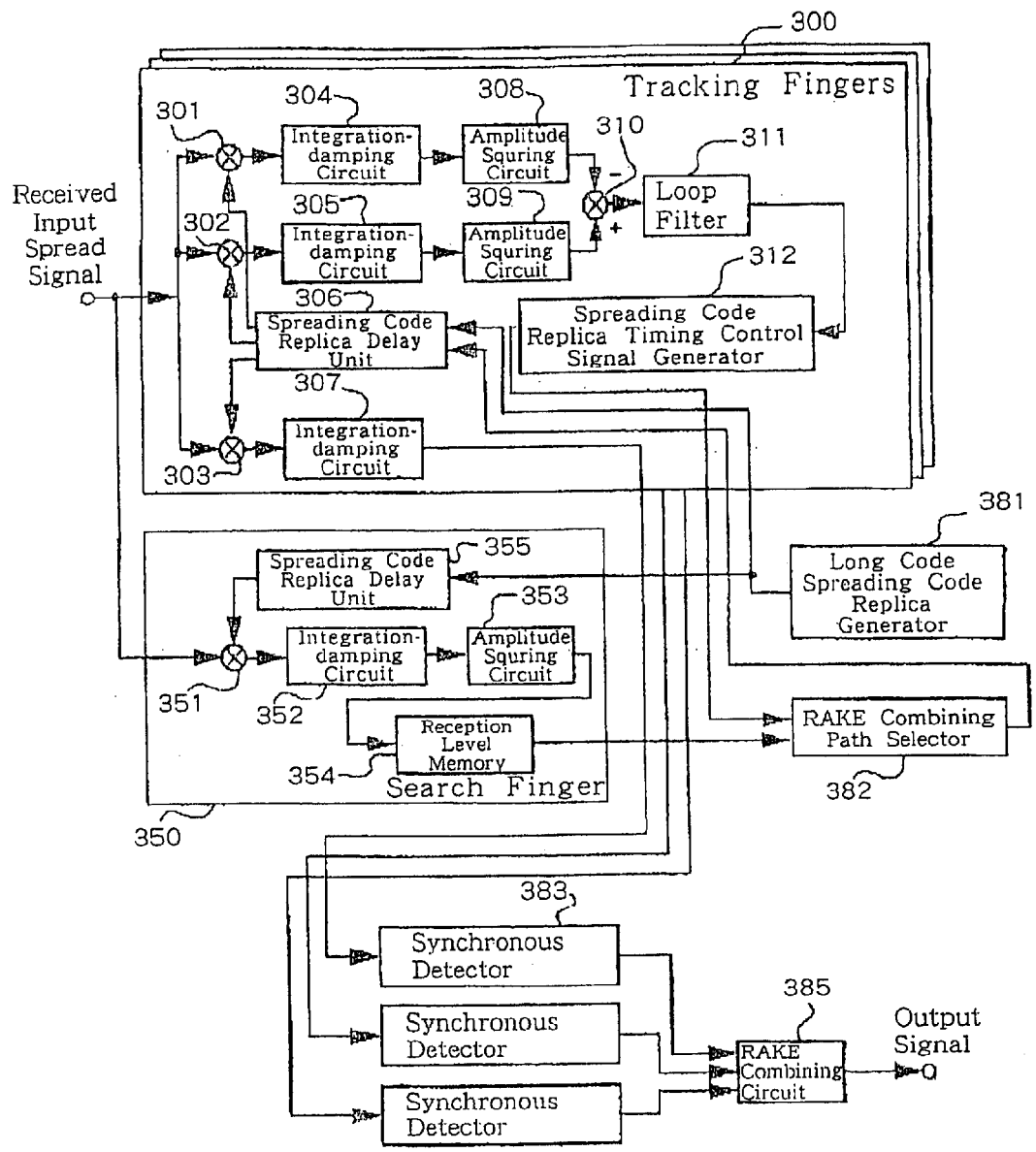
FIG. 5 is a block diagram showing the construction of a CDMA signal receiver of the prior art that operates in accordance with the multipath search method shown in FIG. 4.

When a peak search is performed, the despreading of the received signal is carried out at despreading unit 131 while shifting the phase of the PN code that is generated by PN code generator 136 in increments of, for example, ¼ chip, as in the arrived radiowave search circuit (see FIG. 3) in the receiver of the prior art. This output is integrated by integrator 132, and the integration result is stored in dual-port RAM 134. If the range of the peak search is limited at this time, peak search is performed only within this limited range. Since the speed of shifting the PN code is fixed, the peak search is performed intermittently when the range of the peach search is limited, as compared with a case in which the peak search is executed across the entire range.

A delay profile is stored in dual-port RAM 134 by the above-described process, whereby searcher circuit 135 searches inside dual-port RAM 134, determines the peak positions that are to be assigned to respective baseband reception units 102, and reports the arrival time differences that correspond to the determined peak positions to each of baseband reception units 102.

Figure 8:
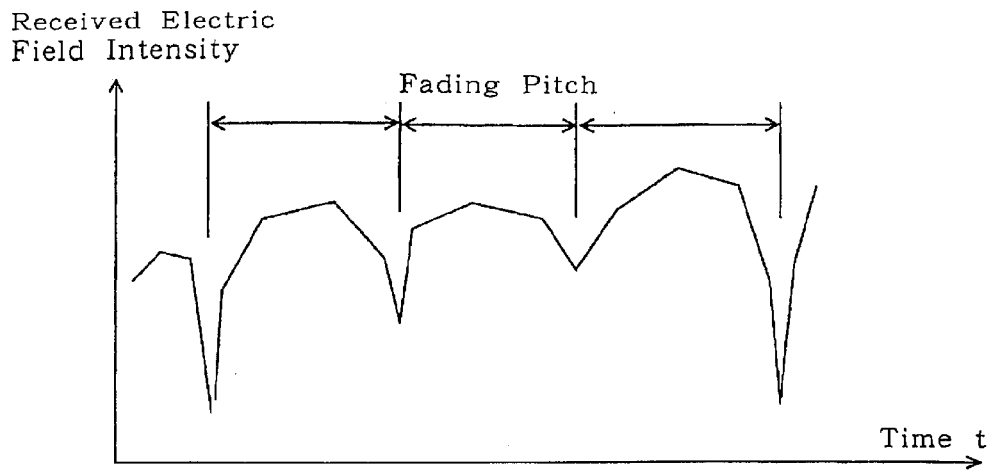
FIG. 8 is a graph showing an example of the change over time of the received electric field intensity due to fading.

In this receiver, electric field intensity measurement unit 112 measures the intensity of the received electric field and detects the fall in received electric field that is brought about by fading. This receiver, which is a mobile terminal, undergoes fading according to the speed of its movement, the arrival times varying for each propagation path. FIG. 8 is a graph showing an example of the variation in received electric field intensity that is caused by fading. The time intervals between the minimal points (troughs) in the received electric field intensity caused by fading are referred to as the "fading pitch." The change in received electric field intensity caused by fading has a strong correlation with the change in the position of peak values in the received signal when chip phase is changed by degrees.

Figure 9:
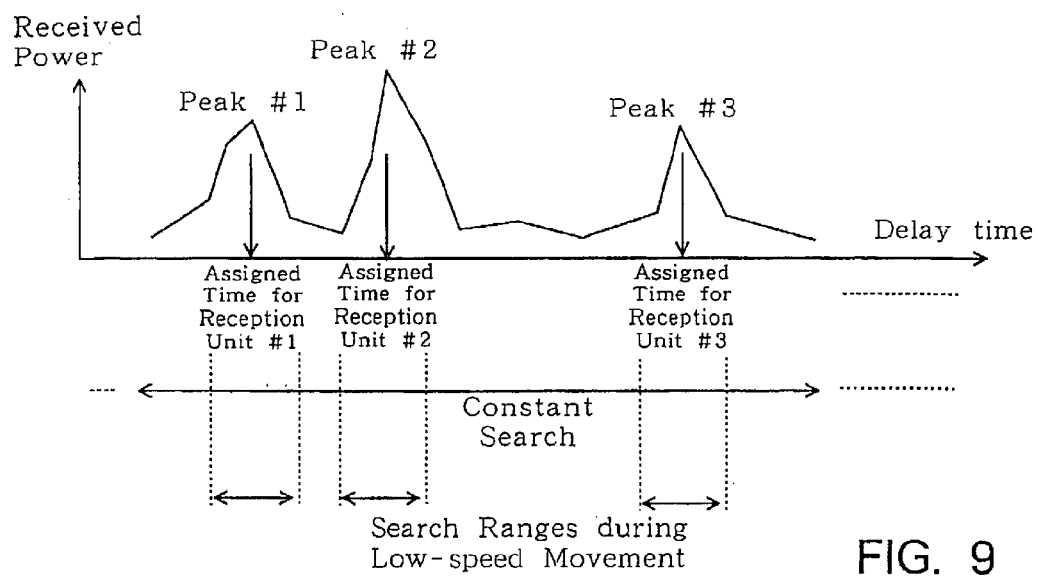
FIG. 9 is a graph showing the relation between the amount of delay of the PN code and the received power, and the search range of the arrived radiowave search circuit.

FIG. 9 shows the relation between the amount of shift in chip phase (time interval t) and the received power after despreading for a case in which the chip phase of the PN code used in despreading is shifted by degrees. Radiowaves that arrive from the transmitting station after passing over different propagation paths have mutually differing arrival times, and therefore exhibit peaks in the received power for different chip phases. Three peaks, peak #1 peak #2 and peak #3, are shown in the example shown in the figure, and the intervals between these peaks correspond to the differences in arrival times.

If the mobile terminal moves at a high rate of speed, peak #1, peak #2, and peak #3 also fluctuate greatly in time, and arrived radiowave search circuit 103 must therefore constantly search for these peaks over the entire conceivable range of change in chip phase. The arrow labeled "constant search" in the figure shows the search range when the mobile terminal is moving at high speed. If the mobile terminal is moving at a low rate of speed, however, the change over time is small, and arrived radiowave search circuit 103 therefore need only search for timings in the small time ranges in the vicinities of timings (arrival times) that were previously searched, and may carry out searches with interspersed time gaps. The arrows labeled "search ranges during low-speed movement" in the figure indicate ranges that should be searched when the mobile terminal is moving at a low speed, i.e., indicate vicinities of arrival times that were previously found for each propagation path. Accordingly, arrived radiowave search circuit 103 can be operated intermittently instead of being operated constantly. Furthermore, although delay profiles are stored inside dual-port RAM 134 in arrived radiowave search circuit 103, the limitation of the ranges of the peak search at times of low-speed movement results in a reduction in both the amount of data that are taken as objects of comparison in dual-port RAM 134 and a reduction in the calculation load for comparison, and all of these factors contribute to the reduction of power consumption.

In this receiver, high-speed movement or low-speed movement is judged based on the intensity of the received electric field intensity that is measured by electric field intensity measurement unit 112. In other words, low speed or high speed is judged by finding the fading period of a fading pitch, in which the received electric field intensity experiences large decreases at fixed intervals as shown in FIG. 8. In an urban area where many buildings are present, the presence of a large number of objects that reflect or diffract radiowaves causes the radiowaves from the transmitting station to exist as a type of standing wave, and the variety of fading becomes Rayleigh fading. As a result, the fading pitch is determined only by the speed of movement of the mobile unit and the frequency of the radiowaves employed and is not affected by the relation between the direction of movement of the mobile unit that incorporates this receiver or the direction of the transmitting station. Specifically, the fading pitch t is represented by:

$$t = c/(f \times v) \qquad (1)$$

where v is the speed of movement, f is the employed frequency, and c is the velocity of light. In other words, the fading pitch t is inversely proportional to the product of the frequency of the radiowaves f and the velocity of movement v. If the reciprocal of the fading pitch is the fading frequency, the fading frequency is proportional to the product of the employed radiowave frequency f and the velocity of movement v. Since the frequency of the employed radiowaves is known, the speed of the receiver (mobile terminal) can be estimated from the fading pitch (fading frequency). The estimated speed of movement can then be compared with a prescribed threshold value to distinguish between high-speed movement and low-speed movement. If the frequency of the employed radiowaves is fixed, the speed of movement varies in inverse proportion to the fading pitch, and the fading pitch (or the fading frequency) can be directly compared with the threshold value. In an ordinary mobile communication system, the frequency of the employed radiowaves can be assumed to be fixed with regard to frequency assignments based on radio law. In any case, arrived radiowave search circuit 103 is operated intermittently under the control from electric field intensity measurement unit 112 in the case of low-speed movement, the search for arrived radiowaves need be performed only in the vicinities of previously searched timings (arrival times), and the average power consumption of arrived radiowave search circuit 103 can be reduced. It is known that the difference between the peaks and troughs of fading increases when the speed of movement is high, and the difference between the peaks and troughs decreases when the speed of movement is low. Fading in which troughs are particularly deep tends to occur during high-speed movement.

Figure 10:
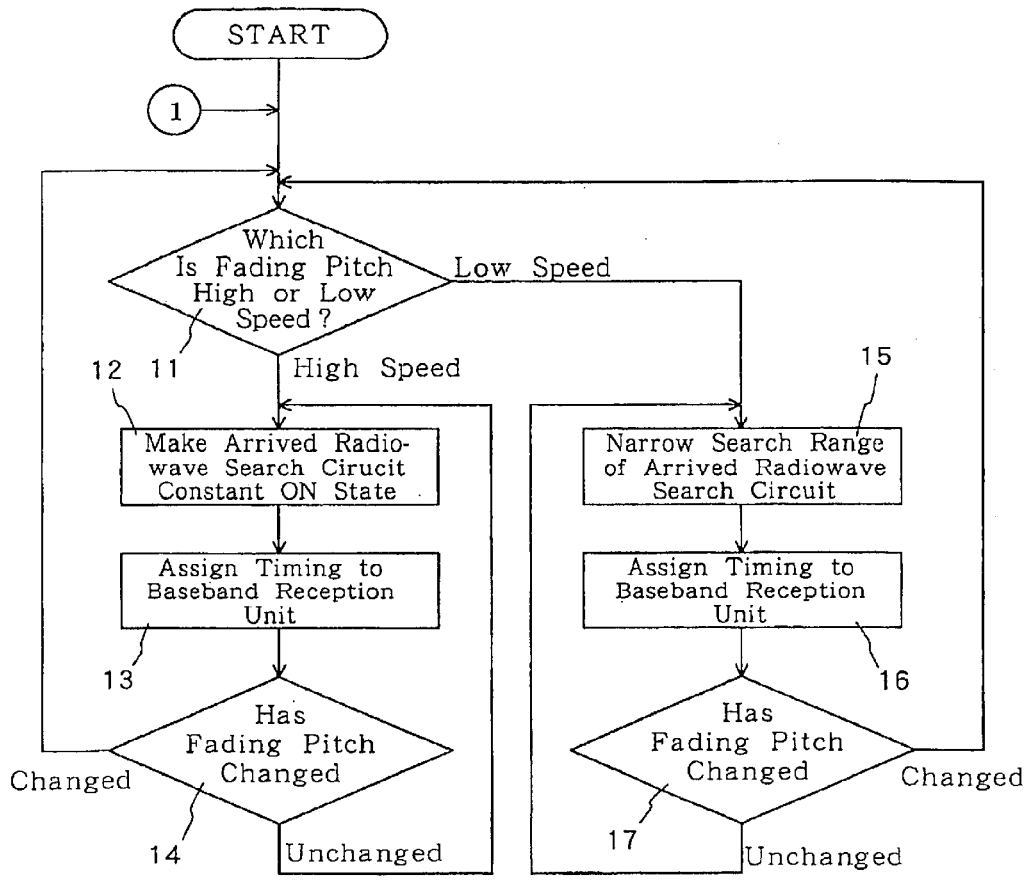
FIG. 10 is a flow chart for explaining the operation of the receiver shown in FIG. 6.

FIG. 10 is a flow chart for explaining the operation of this receiver.

First, in Step 11, electric field intensity measurement unit 112 calculates the electric field intensity of received radiowaves to detect the fading pitch (fading frequency), and then determines the speed of movement of the receiver from the fading pitch. Electric field intensity measurement unit 112 then determines whether the speed of movement is high or low by comparing the speed of movement with a prescribed threshold value.

If the receiver is judged to be moving at high speed in Step 11, arrived radiowave search circuit 103 is placed in a constant ON state in Step 12 and assigns reception timings to each baseband reception unit 102 in Step 13. Then, in Step 14, electric field intensity measurement unit 112 determines if the fading pitch has changed. If the fading pitch has changed, the process returns to Step 11. If there has been no change, the process returns to Step 12.

If the receiver is judged to be moving at low speed in Step 11, on the other hand, the search range of arrived radiowave search circuit 103 is made smaller in Step 15, and reception timings are assigned to each baseband reception unit 102 in Step 16. Electric field intensity measurement unit 112 then judges whether the fading pitch has changed in Step 17. If the fading pitch has changed, the process returns to Step 11. If the fading pitch has not changed, the process returns to Step 15.

These processes eliminate the need to constantly operate arrived radiowave search circuit 103, which assigns reception timings to baseband reception units 102, in the case of low-speed movement, thereby enabling a reduction in the consumption of current and, if the receiver is a portable telephone that uses a battery, allowing a lengthening of the communication time.

Figure 11:
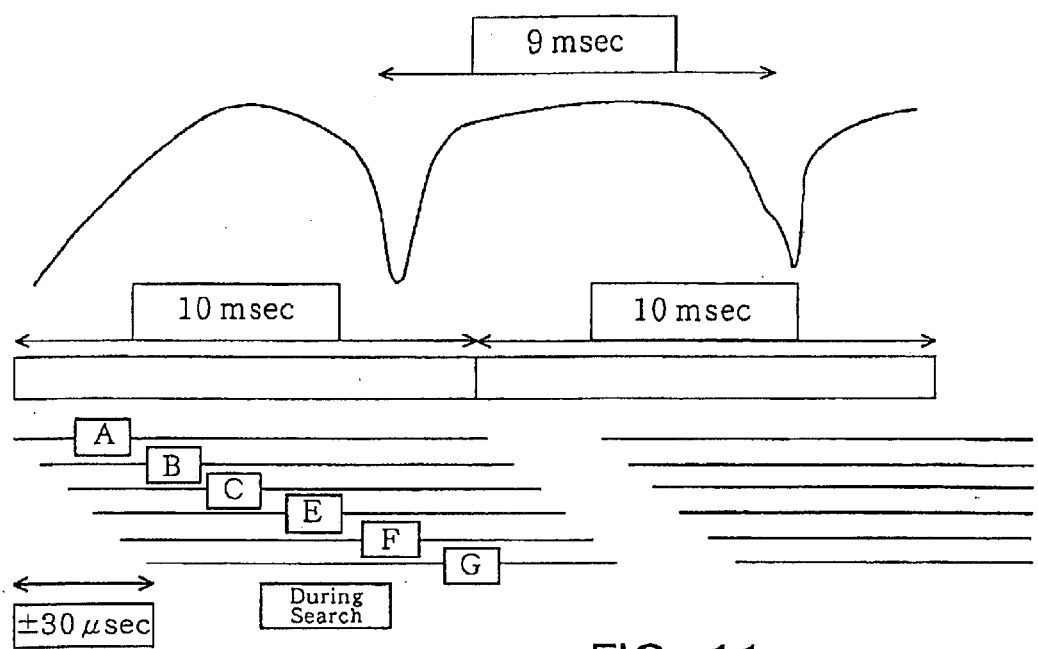
FIG. 11 is a view for explaining the principles of setting the threshold value.

The setting of the threshold value that distinguishes high-speed movement from low-speed movement is next explained. In this embodiment, based on either the speed of movement of the mobile terminal that is found from the fading pitch or on the fading pitch itself, operation is switched between turning arrival time search circuit 103 ON constantly and carrying out a peak search over the entire range of conceivable delay times, or carrying out the peak search only for certain limited ranges that include the previously found peak positions. The threshold value for this switching, i.e., the threshold value for determining low-speed movement or high-speed movement, should be determined by considering the potential for substantial problems arising from a peak search that is carried out only in limited ranges. FIG. 11 is a view for explaining the principles for setting threshold value, and shows the relation between fading and search range. Here, a case is considered in which communication is performed using a frequency of 2 GHz.

If the speed of movement of the mobile terminal is assumed to be 60 km/h (16.7 m/s), equation (1) gives a fading pitch of 9 msec (a fading frequency of 111.1 Hz). In other words, the received electric field intensity rises and falls at a period of 9 msec, as shown in the figure. Further, the lines labeled A, B, . . . , G in the figure show the time ranges of executing a process of calculating power by multiplying received waves in 10-msec units with the PN code. Since an integrating process accompanies the peak search, the time the calculation continues is on the order of milliseconds. A, B, . . . , G correspond to the different peak positions in the delay profile, each being shifted from the others within a range of approximately±30 μsec.

When the receiver is moving at a speed of 60 km/h, the electric field fluctuates greatly during the 10-msec search period, as shown in the figure, making it necessary to calculate peak positions one after another every 10 msec. If the speed of movement then becomes 20 km/h, however, the fading pitch becomes approximately 27 msec, in which a trough in the received field due to fading appears every 27 msec, thereby allowing operation in which calculation is suspended for 10 msec after a calculation of 10 msec. It is possible to set the threshold value by deciding how much time calculation is to be suspended, and then setting the threshold value as the speed of movement that enables this intermittent calculation. It is also possible to cause operation for 10 msec and suspension of operation for 20 msec when the speed of movement is approximately 10 km/h.

In the foregoing explanation, the speed of movement was found by measuring the fading pitch in the received electric field, but in the present invention, the speed of movement can be found from measurements other than the fading pitch, and as a minimum, it is only necessary that high-speed movement be distinguished from low-speed movement. Various methods that can be applied in the present invention for finding the speed of movement from measurements of received electric field are next explained.

Figure 12:
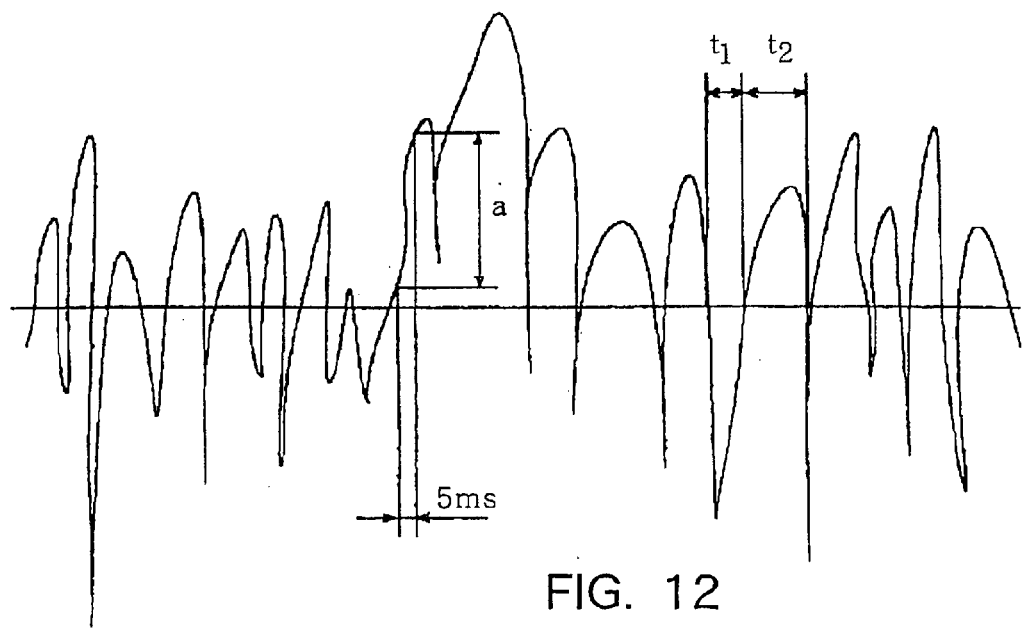
FIG. 12 is a graph showing another example of the change over time of the received electric field intensity due to fading.

FIG. 12 shows an actual example of the change in received electric field intensity in a mobile terminal. In this case, the value of received electric field intensity is measured at predetermined time intervals such as 5-msec intervals, and the amount of fluctuation is calculated as the difference between the successively measured values, i.e., "a" in FIG. 12. The speed of movement can be estimated from this fluctuation amount. Of course, an amount that is not the received electric field intensity itself but that corresponds with the received electric field intensity may be measured. The relation between the amount of fluctuation in the received electric field intensity and the speed of movement may be found in advance. Since a change in the speed of the mobile terminal of several km/h within a time range of, for example, several tens of msec is normally inconceivable, the speed may be taken as the highest value among calculated values of the speed of movement that are obtained from the amount of fluctuation in the received electric field intensity within a predetermined time period.

Alternatively, high-speed movement can be determined if, in a comparison of size of the amount of fluctuation in the received electric field intensity and a prescribed value, the amount of fluctuation is greater; and low-speed movement can be directly determined if the prescribed value is greater. A variety of values are conceivable as the amount of fluctuation, but the use of a fluctuation value that increases with increase in the speed of movement is assumed. As a result, the use of the fading pitch itself is not appropriate, and the reciprocal of fading pitch, i.e., the fading frequency, should be used as the amount of fluctuation. In order to mitigate errors in the determination of speed in this case, the speed may be determined by integrating fluctuation amounts in the received electric field intensity a prescribed number of times or for a prescribed time interval. According to this integrating method, the integrated value increases if one of several measured amounts of fluctuation in received electric field intensity is large, i.e., if the trough of fading is deep.

In addition, it can be determined that the mobile terminal is moving at a high rate of speed if even one of a plurality of determined values obtained from the amount of fluctuation in received electric field intensity within a prescribed time period indicates that the receiver is moving at a high rate of speed.

Finally, the speed of movement of the mobile terminal can be determined by measuring the time that fading is at a peak or at a trough. In FIG. 12, for example, the time interval (t1) that received electric field intensity value falls below a prescribed value and the time interval (t2) that the received electric field intensity exceeds the prescribed value are measured, or the time period of fluctuation in the value of received electric field intensity (t1+t2) is measured, and the speed of movement of the mobile terminal is estimated from t1 and t2, or from t1+t2. In this case, t1 and t2, or t1+t2 are compared with a prescribed value, and it can be determined that the mobile terminal is moving at high speed if the period of fluctuation in received electric field intensity is shorter than a prescribed value. Finally, high-speed movement can be determined if at least one of a plurality of judged values obtained from the period of fluctuation in received electric field intensity within a prescribed time interval corresponds to high-speed movement.

In any case, in the present invention, the range of the peak search is modified after determining whether the mobile terminal is moving at high speed or low speed based on the amount of fluctuation in the received electric field. Various factors can be considered as the amount of fluctuation referred to here, but these include at least one of the fading pitch and the depth of the trough of fading. Further, although described as a determination of high-speed movement or low-speed movement, it is not essential that the speed of the mobile terminal be found as a numerical value. The desired effect can be obtained by a determination that is realized by directly setting the threshold value to, for example, the fading pitch or the depth of the trough of fading.

Figure 13:
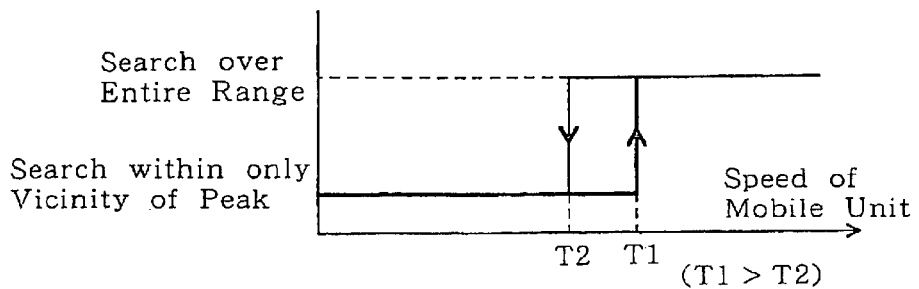
FIG. 13 is a graph for explaining a case in which hysteresis is set in the threshold value.

A hysteresis characteristic may also be added to the threshold value in the present invention. The addition of a hysteresis characteristic can prevent switching at an excessive frequency between a search of the entire search range and a partial search of a delay profile in cases in which the speed of the mobile terminal fluctuates within a range of speed close to the threshold value. FIG. 13 is a graph for explaining a case in which a hysteresis is provided. To switch between a mode in which a search is performed only in the vicinity of peaks that were previously found, i.e., the mode during low-speed movement, and a mode in which a search is performed over the entire range, i.e., the mode during high-speed movement, two threshold values T1 and T2 (where T1>T2) are set to the speed of the mobile unit such that switching from the mode during low-speed movement to the mode during high-speed movement occurs at threshold value T1 and switching from the mode during high-speed movement to the mode during low-speed movement occurs at the threshold value T2.

Figure 14:
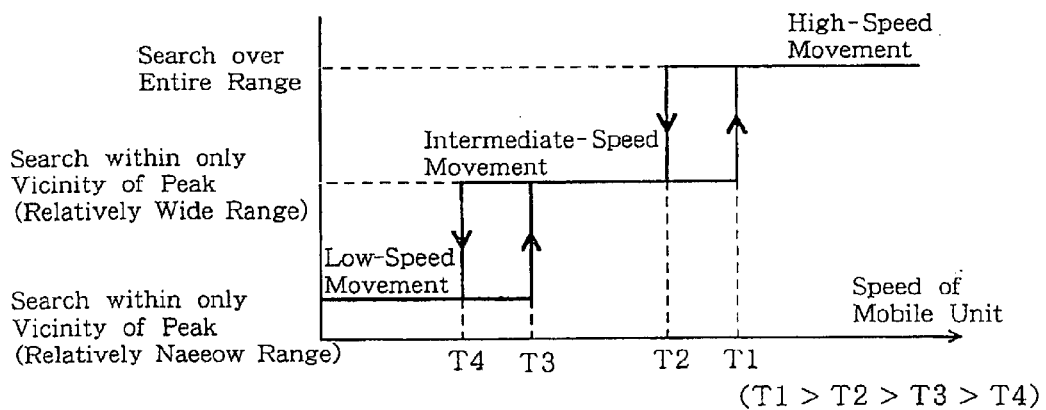
FIG. 14 is a graph for explaining a case in which the search range is switched over three levels and hysteresis is set in the threshold values.

In the above-described embodiment, the range in which a peak search is performed switches between two levels, one in which a search is performed over the entire range and another in which a search is performed only in the vicinities of previously found peaks, but the present invention also allows switching among three or more levels. In a case of switching between three levels, the speed of the mobile unit is divided into the three levels of high speed, intermediate speed, and low speed instead of the two levels of high speed and low speed; and searching is accordingly performed across the entire range for high-speed movement but only in the vicinities of previously found peaks for intermediate-speed movement and low-speed movement. If intermediate-speed movement and low-speed movement are compared in this case, the ranges of peak search for the intermediate speed are relatively wide, while the ranges of peak search for the low speed are relatively narrow. FIG. 14 is a graph for explaining a case in which the ranges of a peak search are changed according to the three levels of high speed, intermediate speed, and low speed; and the threshold value is given a hysteresis characteristic to demarcate each of the modes of high speed, intermediate speed, and low speed. Regarding the speed of the mobile unit, the threshold values for judging high speed and intermediate speed are made T1 and T2, and the threshold values for judging intermediate speed and low speed are made T3 and T4, where T1>T2>T3>T4. Thus, switching from the mode for intermediate-speed movement to the mode for high-speed movement occurs at threshold value T1, switching from the mode for high-speed movement to the mode for intermediate-speed movement occurs at threshold value T2, switching from the mode for low-speed movement to the mode for intermediate-speed movement occurs at threshold value T3, and switching from the mode for intermediate-speed movement to the mode for low-speed movement occurs at threshold value T4.

Figure 15:
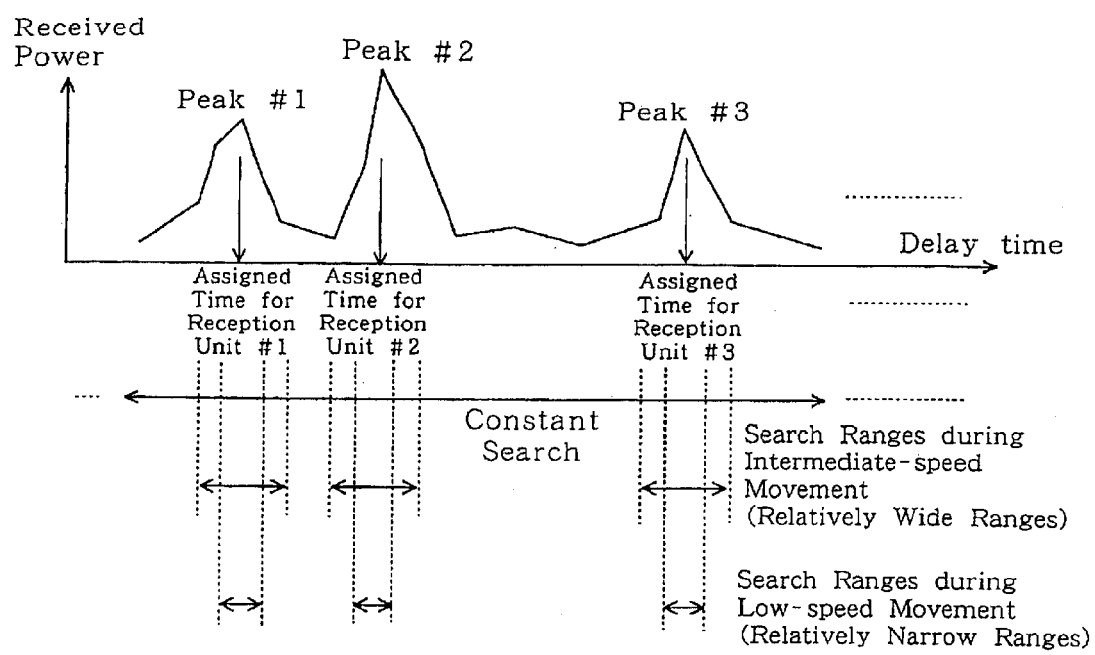
FIG. 15 is a graph showing the relation between the amount of delay of the PN code and received power, and the search range of arrived radiowave search circuit in a case in which the search range is switched over three levels.

FIG. 15 is a view showing the relation between the range of peak search and the positions of peaks in delay profiles when the speed of the mobile unit is divided between high speed, intermediate speed, and low speed. The relation between the mode for high-speed movement and the mode for intermediate-speed movement is equivalent to the relation between the mode for high-speed movement and the mode for low-speed movement in the case of the two-level switching shown in FIG. 9. In the case shown in FIG. 15, on the other hand, regarding the relation between the mode for intermediate-speed movement and the mode for low-speed movement with respect to the ranges of delay times for which a peak search is performed, searches are performed over relatively broad ranges that center on previously found peaks in the mode for intermediate-speed movement, while searches in the mode for low-speed movement are performed over relatively narrow ranges that center on previously found peaks. The power consumption of the arrived radiowave search circuit can be greatly reduced by making the range of the peak search extremely narrow in cases in which the mobile terminal is moving at an extremely low speed that is equal to or slower than the speed of walking, including cases in which the mobile terminal is stationary.

In the above-described examples, the speed of the mobile terminal was divided between the two levels of high-speed/low-speed or the three levels of high-speed/intermediate-speed/low-speed, but the speed of the mobile terminal may also be divided between movement and substantially no movement, i.e., standing still. In more concrete terms, it may first be determined whether fading itself has been observed substantially or not, fading being judged as absent if fading is substantially unobserved, i.e., if the received field is substantially uniform. In cases of no fading, the range of the peak search may be made extremely narrow, and in cases in which fading occurs or in which fading is observed, the peak search may be performed across the entire range. Dividing the speed of the mobile terminal in this way is effective for greatly reducing power consumption in a mobile terminal such as a mobile terminal that is installed on a railway car, in which case the mobile terminal spends most of the time either stopped in a station or a car shed or moving at a speed of several tens of kilometers per hour or more, and almost no time at a low-speed range of less than 20 kilometers per hour.

Figure 16:
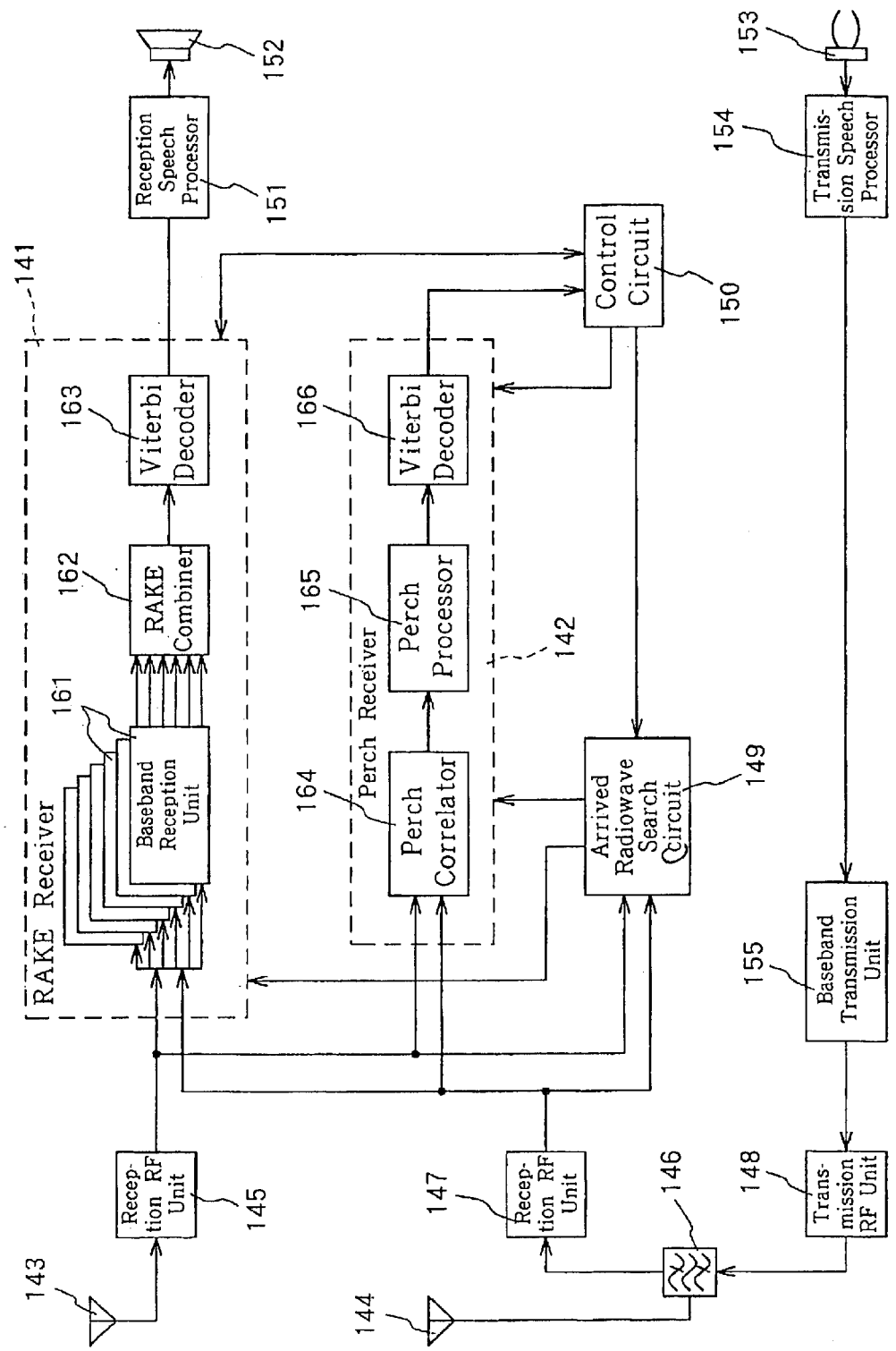
FIG. 16 is a block diagram showing the construction of a receiver according to another embodiment of the present invention.

Another embodiment of the present invention is next described. Actual portable telephones use a special channel referred to as a "perch channel" for capturing or transferring control signals, and are often equipped with two antenna systems: a built-in antenna and a whip antenna that is extracted from the case during use (during communication). Since the whip antenna cannot be used when not communicating, the built-in antenna is provided for receiving, for example, control signals that include a call termination signal. In this embodiment, a receiver is described that both uses a perch channel and is provided with two antennas, a built-in antenna and a whip antenna. FIG. 16 is a block diagram showing the construction of this type of receiver.

Perch receiver 142, which is independent of RAKE receiver 141 for performing RAKE reception, is provided for receiving a perch channel. Built-in antenna 143 is connected to first reception radio-frequency unit 145 that amplifies and frequency-converts radio-frequency received signals that are received by built-in antenna 143 to convert to baseband received signals. The received signals from first reception radio-frequency unit 145 are not only applied to RAKE receiver 141 and perch receiver 142, but also applied to arrived radiowave search circuit 149, to be explained hereinbelow. On the other hand, whip antenna 144 is connected to transmission/reception filter 146 for separating transmission signals and received signals, and the receiving-side port of transmission/reception filter 146, is connected to second reception radio-frequency unit 147, which amplifies and frequency-converts radio-frequency received signals that are received at whip antenna 144 to convert to baseband received signals. Received signals from second reception radio-frequency unit 147 are applied to RAKE receiver 141, perch receiver 142, and arrived radiowave search circuit 149.

RAKE receiver 141 is provided with: a plurality of baseband reception units 161 that receive in parallel baseband received signals from reception radio-frequency units 145 and 147 and perform despreading of the received signals by a prescribed PN code; RAKE combiner 162 for performing RAKE combining of the despread signals that have been outputted from each of baseband reception units 161; and Viterbi decoder 163 for performing Viterbi decoding of the signals after combining. The output of Viterbi decoder 163 is the output of RAKE receiver 141, and this output is converted to speech signals by reception speech processor 151 that decodes to speech signals, and the speech signals following conversion are then outputted from ear receiver 152. In the example shown in the figure, six baseband reception units 161 are provided.

Perch receiver 142 is provided with: perch correlator 164 for receiving baseband received signals from reception radio-frequency units 145 and 147, performing despreading of the received signals by a prescribed PN code, and detecting perch channel signals; perch processor 165 for carrying out signal processing of detected perch channel signals; and Viterbi decoder 166 for carrying out Viterbi decoding of signals following signal processing.

Arrived radiowave search circuit 149 performs a search of arrived radiowaves by detecting peaks of each of the propagation components for which delay times differ for performing RAKE combining, and reports a timing for despreading to each baseband reception unit 161 in RAKE receiver 141 and perch correlator 142 in perch receiver 164. The internal construction of arrived radiowave search circuit 149 is the same as shown in FIG. 7. Information relating to the speed of the mobile unit that incorporates this receiver, however, is not provided from an electric field intensity measurement unit, but from control circuit 150, to be described hereinbelow. Based on the information relating to the speed of the mobile unit, arrived radiowave search circuit 149 switches between setting the range of the peak search to the entire range of conceivable delay times or to a limited range in the vicinities of the already found peaks.

This receiver is also provided with: control circuit 150 for controlling the entire receiver; and a transmission unit that is made up of microphone 153 for converting input speech to electrical signals (speech signals), transmission speech processor 154 for encoding speech signals that are outputted from microphone 153, baseband transmission processor 155 for spread-modulating the encoded signals by a prescribed PN code and converting to baseband transmission signals, and transmission radio-frequency unit 148 for converting the baseband transmission signals to radio-frequency transmission signals. The output of transmission radio-frequency unit 148, i.e., radio-frequency transmission signals, is applied to the transmission-side port of transmission/reception filter 146.

Control circuit 150 in this receiver also takes as input the received electric field intensity values from RAKE receiver 141 after RAKE combining, and the code output and received electric field intensity values of the perch channel from Viterbi decoder 166 in perch receiver 142. Based on these received electric field intensity values, control circuit 150 calculates the speed of the mobile unit that incorporates this receiver from, for example, fading pitch, judges between high-speed movement or low-speed movement, and outputs the result of this judgment to arrived radiowave search circuit 149. In other words, control circuit 150 has the functions of electric field intensity measurement unit 112 (see FIG. 6) in the previously-described basic embodiment.

Figure 17:
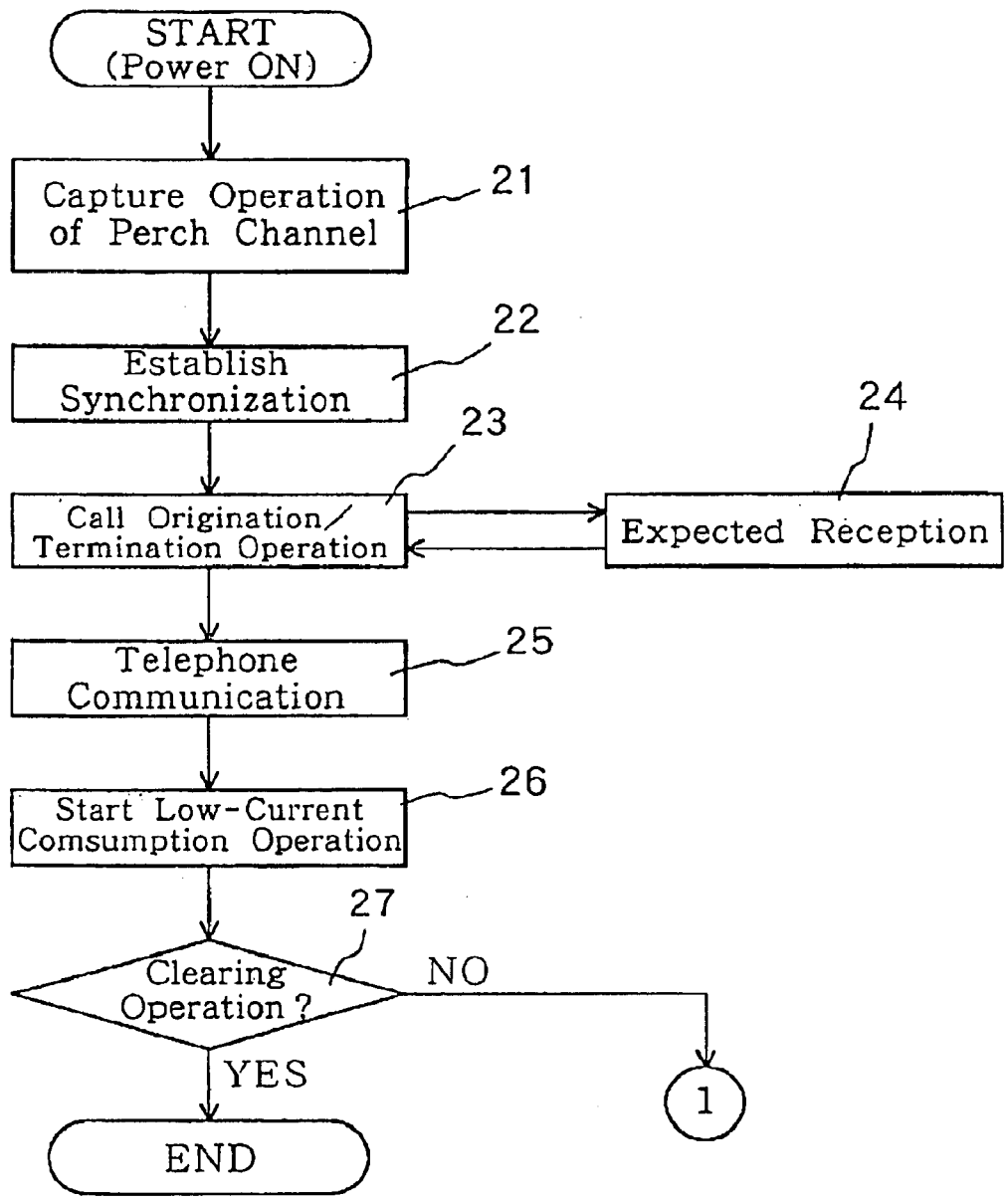
FIG. 17 is a flow chart for explaining the operation of the receiver shown in FIG. 16.

The operation of this receiver is next described with reference to the flow chart of FIG. 17.

First, the capture operation of the perch channel is carried out in Step 21 when the receiver power is turned ON, and synchronization is established in Step 22. Operations for a call origination or a call termination begin in Step 23, and the expected reception is carried out as necessary in Step 24. Telephone communication then begins in Step 25, and low-current consumption operation begins in Step 26. It is then judged in Step 27 whether the clearing operation applies. Processing ends if the clearing operation applies, but if not, processing moves on as shown in the flow chart of FIG. 10, and communication continues with the search range of arrived radiowaves changing according to the speed of the mobile unit.

In the case of low-speed movement in the receiver of this embodiment, there is no need to constantly operate arrived radiowave search circuit 149, which assigns reception timings to baseband processor 161 and perch receiver 142, whereby the consumption of current can be reduced and, if the receiver is a portable telephone that uses a battery, the possible talk time can be lengthened.

INDUSTRIAL APPLICABILITY

According to the present invention, when low-speed movement is determined by observing the received electric field intensity to find the fading pitch and then estimating the speed of movement of the mobile terminal from the fading pitch, the arrived radiowave search circuit can be operated intermittently and searches of arrived radiowaves can be performed only in the vicinities of previously searched timings (arrival times), thereby allowing a reduction in the power consumption of the entire mobile terminal and an extension in the possible talk time.

What is claimed is:

1. A Code Division Multiple Access (CDMA) reception circuit that is a reception circuit in a mobile terminal that uses a spread spectrum to realize communication, performs a search of arrived radiowaves that detects radiowaves of propagation paths having different delay times, and uses RAKE combining to combine received signals from radiowaves of different propagation paths; characterized in that
an amount of fluctuation of received electric field of the received signals is detected, it is distinguished, based on said amount of fluctuation, whether said mobile terminal is in a state of relatively high-speed movement or in a state of relatively low-speed movement, and during said state of relatively low-speed movement, said search of arrived radiowaves is performed intermittently by performing said search of arrived radiowaves only in vicinities of previously found arrival times for each of said propagation paths.

2. A Code Division Multiple Access (CDMA) reception circuit that is a reception circuit in a mobile terminal that uses a spread spectrum to realize communication, performs a search of arrived radiowaves that detects radiowaves of propagation paths having different delay times, and uses RAKE combining to combine received signals from radiowaves of different propagation paths; characterized in that
an amount of fluctuation in received electric field of the received signals is detected, it is distinguished whether a value of said amount of fluctuation is in a relatively high value state or a relatively low value state, and when the value of said amount of fluctuation is in said relatively low value, said search of arrived radiowaves is performed intermittently by performing said search of arrived radiowaves only in vicinities of previously found arrival times for each of said propagation paths.

3. A Code Division Multiple Access (CDMA) reception method that is a reception method in a mobile terminal that uses a spread spectrum to realize communication, performs a search of arrived radiowaves to detect radiowaves of propagation paths having different delay times, and uses RAKE combining to combine received signals from radiowaves of different propagation paths; wherein said CDMA reception method comprising the steps of:
detecting an amount of fluctuation in received electric field of the received signals; and
switching a range of delayed time in which a search of said arrived radiowaves is performed among a plurality of levels according to said amount of fluctuation;
wherein a range of delay time in which a search of said radiowaves is performed at a level of said plurality of levels that accords with an amount of fluctuation that corresponds to a relatively high speed of movement of said mobile terminal is greater that an range of delay time in which a search of said radiowaves is performed at a level that accords with an amount of fluctuation that corresponds to a relatively low speed of movement.

4. A CDMA reception method according to claim 3, wherein said amount of fluctuation is at least one of fading pitch and depth of fading.

5. A Code Division Multiple Access (CDMA) reception method in a mobile terminal that uses a spread spectrum to realize communication, performs a search of arrived radiowaves to detect radiowaves of propagation paths having different delay times, and uses RAKE combining to combine received signals from radiowaves of different propagation paths; said CDMA reception method comprising the steps of:
detecting an amount of fluctuation in received electric field of the received signals;
distinguishing whether said mobile terminal is in a relatively high-speed state or a relatively low-speed state based on said amount of fluctuation; and
performing search of said arrived radiowaves intermittently by performing a search of said arrived radiowaves only in vicinities of previously found arrival times for each of said propagation paths when said mobile terminal is in said relatively low-speed state.

6. A CDMA reception method according to claim 5, wherein said amount of fluctuation is at least one fading pitch and depth of fading.

7. A Code Division Multiple Access (CDMA) reception method that is a reception method in a mobile terminal that uses a spread spectrum to realize communication, performs a search of arrived radiowaves to detect radiowaves of propagation paths having different delay times, and uses RAKE combining to combine received signals from radiowaves of different propagation paths; said CDMA reception method comprising the steps of:
detecting an amount of fluctuation in received electric field;
distinguishing whether said mobile terminal is in a relatively high-speed state or a relatively low-speed state based on said amount of fluctuation by comparing with a threshold value; and
performing a search of said arrived radiowaves intermittently by performing a search of said arrived radiowaves only in vicinities of previously found arrival times of each of said propagation paths when said mobile terminal is in said relatively low-speed state.

8. A CDMA reception method according to claim 7, wherein a hysteresis characteristic is added in which a threshold value that corresponds to a transition from said state of relatively low speed of movement to said state of relatively high speed of movement differs form a threshold value that corresponds to a transition form said state of relatively high speed of movement to said state of relatively low speed of movement.

9. A CDMA reception method according to claim 7, wherein said amount of fluctuation is at least one of fading pitch and depth of fading.

10. A Code Division Multiple Access (CDMA) reception method that is a reception method in a mobile terminal that uses a spread spectrum to realize communication, performs a search of arrived radiowaves to detect propagation paths having different delay times, and uses RAKE combining to combine received signals from radiowaves of different propagation paths; said CDMA reception method comprising the steps of:

detecting an amount of fluctuation in received electric field of the received signals;

distinguishing whether value of said amount of fluctuation is in a relatively large value state or a relatively small value state; and performing a search of said arrived radiowaves intermittently by performing a search of said arrived radiowaves only in vicinities of previously found arrival times for each of said propagation paths when the value of said amount of fluctuation is in the relatively small value state.

11. A CDMA reception method according to claim 10, wherein said amount of fluctuation is at least one of a reciprocal of fading pitch and depth of fading.

12. A Code Division Multiple Access (CDMA) reception method that is a reception method in a mobile terminal that uses a spread spectrum to realize communication, performs a search of arrived radiowaves to detect propagation paths having different delay times, and uses RAKE combining to combine received signals from radiowaves of different propagation paths; said CDMA reception method comprising the steps of:

detecting an amount of fluctuation in received electric field;

comparing a value of said amount of fluctuation with a prescribed threshold value; and performing a search of said arrived radiowaves intermittently by preforming a search of said arrived radiowaves only in vicinities of previously found arrival times for each of said propagation paths when the value of said amount of fluctuation is smaller than said threshold value.

13. A CDMA reception method according to claim 12, wherein said amount of fluctuation is at least one of a reciprocal of fading pitch and depth of fading.

14. A Code Division Multiple Access (CDMA) reception circuit that is a reception circuit in a mobile terminal that uses a spread spectrum to realize communication, and uses RAKE combining to combine received signals from radiowaves of different propagation paths; said CDMA reception circuit comprising:

baseband reception means for performing despreading of the received signals;

electric field intensity measurement means for detecting an amount of fluctuation in received electric field of the received signals; and an arrived radiowave search circuit for performing a search of arrived radiowaves that detects radiowaves of propagation paths of different delay times, and assigning radiowaves of different propagation paths to respective said baseband reception means;

wherein a range of delay time of the search of arrived radiowaves that is performed by said arrived radiowave search circuit changes when said amount of fluctuation satisfies a prescribed condition; and said arrived radiowave search circuit operates intermittently when the range of delay time of the arrived radiowave search performed by said arrived radiowave search circuit is modified to become smaller.

15. A CDMA reception circuit according to claim 14, wherein said prescribed condition is the absence of fading.

16. A CDMA reception circuit according to claim 14, wherein said amount of fluctuation is at least one of fading pitch and depth of fading.

17. A CDMA reception circuit according to claim 14, wherein said baseband reception means is constituted by a plurality of baseband reception units necessary for RAKE reception.

18. A Code Division Multiple Access (CDMA) reception circuit that is a reception circuit in a mobile terminal that uses a spread spectrum to realize communication and uses RAKE combining to combine received signals from radiowaves of different propagation paths; said CDMA reception circuit comprising:

baseband reception means for performing despreading of the received signals;

electric field intensity measurement means for detecting an amount of fluctuation in received electric field of the received signals; and an arrived radiowave search circuit for performing a search of arrived radiowaves that detects radiowaves of propagation paths of different delay times, and assigning radiowaves of different propagation paths to respective said baseband reception means;

wherein a range of delay time in which said arrived radiowave search circuit performs a search of arrived radiowaves is switched among a plurality of levels according to said amount of fluctuation such that the range of delay time in which said radiowave search is performed at the level for an amount of fluctuation that corresponds to relatively high speed of movement of said mobile terminal is greater than the range of delay time in which said radiowave search is performed at the level for an amount of fluctuation that corresponds to a relatively low speed of movement.

19. A CDMA reception circuit according to claim 18, wherein said arrived radiowave search circuit operates intermittently when the range of delay time of the arrived radiowave search performed by said arrived radiowave search circuit is modified to become smaller.

20. A CDMA reception circuit according to claim 18, wherein said amount of fluctuation is at least one of fading pitch and depth of fading.

21. A CDMA reception circuit according to claim 18 wherein said baseband reception means is constituted by a plurality of baseband reception units necessary for RAKE reception.

22. A Code Division Multiple Access (CDMA) reception circuit that is a reception circuit in a mobile terminal that uses a spread spectrum to realize communication and uses RAKE combining to combine received signals from radiowaves of different propagation paths; said CDMA reception circuit comprising:

baseband reception means for performing despreading of the received signals;

electric field intensity measurement means for detecting an amount of fluctuation in received electric field of the received signals; and an arrived radiowave search circuit for performing a search of arrived radiowaves that detects radiowaves of propagation paths of different delay ties, and assigning radiowaves of different propagation paths to respective said baseband reception means;

wherein speed of movement of said mobile terminal is estimated from a value of said amount of fluctuation, and it is distinguished whether said mobile terminal is in a state of relatively low-speed movement or in a state of relatively high-speed movement, and when in said stat of relatively low-speed movement, said arrived radiowave search circuit performs said search of arrived radiowaves only in vicinities of previously found arrival times for each of said propagation paths.

23. A Code Division Multiple Access (CDMA) reception circuit that is a reception circuit in a mobile terminal that is a reception circuit in a mobile terminal that uses a spread spectrum to realize communication and uses RAKE combining to combine received signals from radiowaves of different propagation paths; said CDMA reception circuit comprising:

a plurality of baseband reception units for performing despreading of the received signals;

electric field intensity measurement means for detecting an amount of fluctuation in received electric field of the received signals; and an arrived radiowave search circuit for performing a search of arrived radiowaves that detects radiowaves of propagation paths of different delay times, and assigning radiowaves of different propagation paths to respective said baseband reception units;

wherein speed of movement of said mobile terminal is estimated from a value of said amount of fluctuation, said speed of movement is compared with a prescribed threshold value, and when a value of said speed of movement is smaller than said threshold value, said arrived radiowave search circuit performs said search of arrived radiowaves only in vicinities of previously found arrival times for each of said propagation paths.

24. A Code Division Multiple Access (CDMA) reception circuit that is a reception circuit in a mobile terminal that uses a spread spectrum to realize communication and uses RAKE combining to combine received signals from radiowaves of different propagation paths; said CDMA reception circuit comprising:

baseband reception means for performing despreading of the received signals;

electric field intensity measurement means for detecting an amount of fluctuation in received electric field of the received signals; and and arrived radiowave search circuit for performing a search of arrived radiowaves that detects radiowaves of propagation paths of different delay times, and assigning radiowaves of different propagation paths to respective said baseband reception means;

wherein it is distinguished whether a value of said amount of fluctuation is in a relatively high value state or a relatively low value state, and when the value of said amount of fluctuation is in said relatively low value state, said arrived radiowave search circuit performs said search of arrived radiowaves only in vicinities of previously found arrival times for each of said propagation paths.

25. A CDMA reception circuit according to claim 24, wherein said arrived radiowave search circuit operates intermittently when performing said search of arrived radiowaves only in vicinities of previously found arrival times for each of said propagation paths.

26. A CDMA reception circuit according to claim 24, wherein said amount of fluctuation is at least one of a reciprocal of fading pitch and depth of fading.

27. A Code Division Multiple Access (CDMA) reception circuit that is a reception circuit in a mobile terminal that uses a spread spectrum to realized communication and uses RAKE combining to combine received signals from radiowaves of different propagation paths; said CDMA reception circuit comprising:

baseband reception means for performing despreading of the received signals;

electric field intensity measurement means for detecting an amount of fluctuation in received electric field of the received signals; and an arrived radiowave search circuit for performing a search of arrived radiowaves that detects radiowaves of propagation paths having different delay times, and assigning radiowaves of different propagation paths to respective said baseband reception means;

wherein a value of said amount of fluctuation is compared with a prescribed threshold value, and when the value of said amount of fluctuation is smaller that said threshold value, said arrived radiowave search circuit performs said search of arrived radiowaves only in vicinities of previously found arrival times for each of said propagation paths.

28. A CDMA reception circuit according to claim 27, wherein said arrived radiowave search circuit operates intermittently when performing said search of arrived radiowaves only in the vicinities of previously found arrival times for each of said propagation paths.

29. A CDMA reception circuit according to clam 27, wherein said amount of fluctuation is at least one of a reciprocal of fading pitch and depth of fading.

* * * * *